United States Patent
Veryaskin et al.

(10) Patent No.: US 12,487,249 B2
(45) Date of Patent: Dec. 2, 2025

(54) CAPACITANCE SENSING METHOD AND ASSEMBLY

(71) Applicants: Alexey Vladimirovich Veryaskin, Hocking (AU); Khyl John Robert McMahon, Inglewood (AU); Frank Joachim van Kann, Mount Claremont (AU)

(72) Inventors: Alexey Vladimirovich Veryaskin, Hocking (AU); Frank Joachim van Kann, Mount Claremont (AU)

(73) Assignees: Alexey Vladimirovich Veryaskin (AU); Frank Joachim Van Kann (AU); Khyl John Robert McMahon (AU)

( * ) Notice: Subject to any disclaimer, the term of this patent is extended or adjusted under 35 U.S.C. 154(b) by 221 days.

(21) Appl. No.: 18/230,348

(22) Filed: Aug. 4, 2023

(65) Prior Publication Data
US 2023/0384342 A1    Nov. 30, 2023

Related U.S. Application Data

(63) Continuation-in-part of application No. 17/988,033, filed on Nov. 16, 2022, now abandoned.

(30) Foreign Application Priority Data

Nov. 16, 2021 (AU) ............................... 2021903674

(51) Int. Cl.
*G01P 15/125* (2006.01)
*G01V 7/04* (2006.01)

(52) U.S. Cl.
CPC .............. *G01P 15/125* (2013.01); *G01V 7/04* (2013.01)

(58) Field of Classification Search
CPC ....................................................... G01P 15/125
(Continued)

(56) References Cited

U.S. PATENT DOCUMENTS

| | | | |
|---|---|---|---|
| 2016/0202286 A1* | 7/2016 | Aaltonen | G01P 15/125 73/1.38 |
| 2023/0152346 A1 | 5/2023 | Veryaskin | |

OTHER PUBLICATIONS

Abstract for Braginskii et al., Measurement of Weak Forces in Physics Experiments, Chicago, University of Chicago Press, 1977. (1 page).

(Continued)

*Primary Examiner* — Walter L Lindsay, Jr.
*Assistant Examiner* — Philip T Fadul
(74) *Attorney, Agent, or Firm* — RowanTree Law Group, PLLC; Joseph W. Schmidt

(57) ABSTRACT

A capacitance sensing assembly is provided. The capacitance sensing assembly includes an op-amp arranged with four complex impedance circuits and a sensing capacitor connected to the fourth complex impedance circuit and ground; or to the non-inverting input of the op-amp, the fourth complex impedance circuit, ground and the second terminal of the fourth complex impedance circuit, wherein the fourth complex impedance circuit is connected in parallel to the sensing capacitor. The complex impedance circuits are configured to increase a gradient of a phase to frequency response curve of the capacitance sensing assembly relative to that of an all-pass filter with a second electrode of a capacitor connected to the non-inverting input of the op-amp and the ground without the fourth complex impedance circuit.

8 Claims, 15 Drawing Sheets

(58) Field of Classification Search
USPC .................................................. 73/514.32
See application file for complete search history.

(56) References Cited

OTHER PUBLICATIONS

Ashrafi et al., "A high precision method for measuring very small capacitance changes," Review of Scientific Instruments, Aug. 1999, 70(8): pp. 3483-3487. (5 pages).

Matko et al., "Temperature-compensated capacitance-frequency converter with high resolution," Sensors and Actuators A: Physical, 2014, 220: pp. 262-269. (8 pages).

* cited by examiner

CAPACITANCE SENSING METHOD AND ASSEMBLY

RELATED APPLICATIONS

The present application claims priority from Australian provisional patent application No. 2021903674, filed Nov. 16, 2021 and U.S. non-provisional application Ser. No. 17/988,033, filed Nov. 16, 2022, the contents of which are hereby incorporated in their entirety by reference.

TECHNICAL FIELD

The disclosed subject matter relates to a capacitance sensing assembly for use with accelerometers gravimeters, gravity gradiometers and other instruments and appliances where it is necessary to sense a physical parameter. The disclosed subject matter also relates to methods for improving sensitivity of capacitive sensing assemblies.

BACKGROUND

Any references to methods, apparatus or documents of the prior art are not to be taken as constituting any evidence or admission that they formed, or form part of the common general knowledge.

A capacitor becomes a variable capacitor when one of its electrodes is free to move under external disturbances and another one is fixed. Their relative motion changes the value of the mutual capacitance acting as the measure of the external factors causing the disturbances. A capacitor can also change its value if electric charge is applied to one of the capacitor's electrodes. Such capacitors are called varactors or "varicaps". By measuring this particular capacitance change it is possible to measure applied electric field. The change of the capacitive value should be translated into a measurable quantity—audio, RF, microwave, optical signals' amplitude, or phase. Phase is more desirable quantity as the primary sensing elements (capacitance-to-phase transducers) can be incorporated into interferometric read-out where one arm of an interferometer contains the variable capacitor, and another contains a fixed one. Interferometric measurements provide the most sensitive instrumentation for the detection of ultra-small phase difference in the identical carrier signals propagating through the interferometer's arms.

The ability to measure minute variations of electric capacitance leads to a large number of academic and industrial applications including fundamental research and defense.

For example, in the paper *A High Precision Method for Measuring very Small Capacitance Changes* by Ashkan Ashrafi and Hossein Golnabie (Review of Scientific Instruments Vol 70, No. 8 Aug. 1999) the authors describe a method for measuring very small capacitance changes based on capacitance-to-phase angle conversion. The method involves using a conventional quadrature phase sensitive detector (PSD) that provides the cotangent of the output phase in order to arrive at a linear relationship between the input capacitance and the output of the PSD. Implementation of the method is believed to be complex, and the Authors reported instabilities in their readout system that they believed were due to jitter in the main oscillator which would require a very stable oscillator to address.

Not all methods and apparatus to measure minute variations of electric capacitance allow for the use of grounded variable capacitors, which is desirable for most applications of interest. Matko and Milanović (*Temperature-compensated capacitance-frequency converter with high resolution*; Sensors and Actuators A 220 (2014) 262-269) described a temperature-compensated capacitance-to-frequency converter with a claimed resolution of +/−20 Zeptofarads (zF, 1 zF=$10^{-21}$ Farad). However, this approach uses a not-grounded variable capacitor and cannot be easily adapted for, say, ultra-precision mechanical displacement measurements. Also, a high Q resonant LC-tank can be used as a simple circuit for either amplitude or phase sensitive ultra-small capacitance variation detection (*Measurement of weak forces in physics experiments*/V. B. Braginsky and A. B. Manukin; edited by David H. Douglass; Chicago: University of Chicago Press, 1977). Typically, it involves very high Q (Q>>100) values and represents a narrow-band detector where extremely high stability of its operation point is required.

Devices based on variable capacitors have been under development for many decades in such areas as precision accelerometry, gravimetry and gravity gradiometry. Precision accelerometers based on the MEMS technology have established their presence almost everywhere from smartphones and robotics to strategic defense applications and space missions.

In some solutions, a complex impedance circuit is used as a weakly resonant tank where an inductor L and a resistor R are connected in series while a capacitor C, connected in parallel to the inductor L and resistor R, represents another arm of the tank.

Such circuits are no longer a classic All-Pass architecture, but a single op-amp notch filter that can have different notch depths at different frequencies depending on first capacitor with a first electrode connected to a non-inverting input of the op-amp. This capacitor plays role of a tune-capacitor which is used to tune the whole circuit to optimum frequency-to-phase and frequency-to-amplitude transfer functions.

While these circuits and assembles demonstrate a high capacitance-to-phase conversion rate and a low frequency-to-amplitude modulation rate, unwanted frequency-to-amplitude modulation rate remains a problem.

Consequently, there is a need for a capacitance sensing assembly that is relatively straightforward and thus compact to implement and which can measure capacitance variations.

SUMMARY

According to a first aspect of the disclosed subject matter, there is provided a capacitance sensing assembly comprising:
an all-pass filter including an op-amp and a first capacitor with a first electrode of the first capacitor connected to a non-inverting input of the op-amp; and
a complex impedance circuit connected between a second electrode of the first capacitor and a ground and including a variable capacitor having a terminal connected to the ground;
wherein the complex impedance circuit is configured to increase a gradient of a phase to frequency response curve of the capacitance sensing assembly relative to that of the all-pass filter with the second electrode of the first capacitor connected to ground without the complex impedance circuit.

In an embodiment the complex impedance circuit comprises a resonant circuit wherein the variable capacitor comprises a capacitor of the resonant circuit.

In an embodiment the resonant circuit comprises an inductor-capacitor tank circuit.

In an embodiment the variable of the resonant circuit is implemented with a capacitance magnifier circuit to thereby simulate a larger capacitance value variable capacitor with a smaller capacitance value variable capacitor.

In an embodiment the complex impedance circuit comprises a negative capacitor circuit.

In an embodiment the negative capacitor circuit includes a second capacitor in parallel with the negative capacitor sensor.

According to a further aspect there is provided a capacitor sensing assembly wherein a variable capacitor thereof comprises a component of a resonant circuit.

In another aspect there is provided a capacitor sensing assembly wherein a variable capacitor thereof comprises a component of a capacitor multiplier circuit.

In a further aspect there is provided a capacitor sensing assembly wherein a variable capacitor thereof comprises a component of a negative capacitance circuit.

In a further aspect there is provided a method for improving sensitivity of a capacitor sensing assembly, the method comprising:
  replacing a variable capacitor ("first variable capacitor") of the capacitor sensing assembly with a capacitor multiplier circuit, the capacitor multiplier circuit including a variable capacitor ("second variable capacitor") wherein the second variable capacitor has a smaller capacitance than the first variable capacitor.

In an embodiment the capacitor multiplier circuit forms part of a resonant circuit.

In another aspect there is provided a method for improving sensitivity of a capacitor sensing assembly having a first capacitor, the method comprising:
  connecting a negative capacitance in series with the first capacitor to thereby produce an effective variable capacitance having a capacitance value less than the first capacitor.

According to another aspect of the disclosed subject matter, there is provided a capacitance sensing assembly comprising:
  an op-amp;
  a first complex impedance circuit with a first terminal of the first complex impedance circuit connected to an inverting input of the op-amp;
  a second complex impedance circuit with a first terminal of the second complex impedance circuit connected to a second terminal of the first complex impedance circuit and a second terminal of the second complex impedance circuit connected to the non-inverting input of the op-amp;
  a third complex impedance circuit with a first terminal of the third complex impedance circuit connected to the inverting input of the op-amp and a second terminal of the third complex impedance circuit connected to an output of the op-amp;
  a fourth complex impedance circuit with a first terminal of the fourth complex impedance circuit connected to the non-inverting input of the op-amp;
  a sensing capacitor with:
    a first electrode of the sensing capacitor connected to a second terminal of the fourth complex impedance circuit and a second electrode of the sensing capacitor connected to a ground; or
    the first electrode of the sensing capacitor connected to the non-inverting input of the op-amp and the first terminal of the fourth complex impedance circuit and the second electrode of the sensing capacitor connected to the ground and the second terminal of the fourth complex impedance circuit, wherein the fourth complex impedance circuit is connected in parallel to the sensing capacitor; and
  wherein the complex impedance circuits are configured to increase a gradient of a phase to frequency response curve of the capacitance sensing assembly relative to that of an all-pass filter with a second electrode of a capacitor connected to the non-inverting input of the op-amp and the ground without the fourth complex impedance circuit.

In an embodiment, the first, second and third complex impedance circuits include resistors.

In an embodiment, the first, second and third complex impedance circuits consist of resistors.

In an embodiment, the fourth complex impedance circuit comprises a first capacitor.

In an embodiment, the first capacitor is a variable capacitor.

In an embodiment the fourth complex impedance circuit comprises a second capacitor in parallel with the first capacitor.

In an embodiment, the fourth complex impedance comprises a resistor, an inductor connected in series with the resistor and the ground, and a first capacitor connected to a first terminal of the resistor, a first terminal of the inductor and the ground.

According to another aspect of the disclosed subject matter, there is provided a capacitance sensing assembly comprising:
  an op-amp;
  a first complex impedance circuit with a first terminal of the first complex impedance circuit connected to an inverting input of the op-amp;
  a second complex impedance circuit with a first terminal of the second complex impedance circuit connected to a second terminal of the first complex impedance circuit and a second terminal of the second complex impedance circuit connected to the non-inverting input of the op-amp;
  a third complex impedance circuit with a first terminal of the third complex impedance circuit connected to the inverting input of the op-amp and a second terminal of the third complex impedance circuit connected to an output of the op-amp;
  a fourth complex impedance circuit with a first terminal of the fourth complex impedance circuit connected to the non-inverting input of the op-amp; and
  a sensing capacitor with:
    a first electrode of the sensing capacitor connected to a second terminal of the fourth complex impedance circuit and a second electrode of the sensing capacitor connected to a ground; or
  the first electrode of the sensing capacitor connected to the non-inverting input of the op-amp and the first terminal of the fourth complex impedance circuit and the second electrode of the sensing capacitor connected to the ground and the second terminal of the fourth complex impedance circuit, wherein the fourth complex impedance circuit is connected in parallel to the sensing capacitor.

In an embodiment the capacitance sensing assembly forms part of an integrated circuit.

BRIEF DESCRIPTION OF THE DRAWINGS

Preferred features, embodiments and variations the subject matter disclosed herein may be discerned from the following Detailed Description which provides sufficient information for those skilled in the art to perform the disclosed subject matter. The Detailed Description is not to be regarded as limiting the scope of the preceding Summary of the disclosed subject matter in any way. The Detailed Description will make reference to a number of drawings as follows.

DETAILED DESCRIPTION OF PREFERRED EMBODIMENTS

Figure 1:
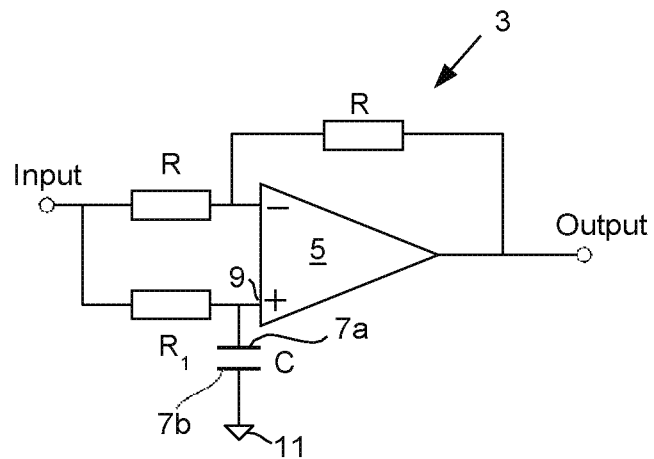
FIG. 1 is a circuit diagram of a capacitively grounded all-pass filter.

FIG. 1 is a circuit schematic of an all-pass filter 3 which has a capacitor C connected by its electrode 7a to the non-inverting input 9 of the op-amp 5 and by its opposite electrode 7b to ground 11. All-pass filters have no amplitude roll-off properties. That is, the magnitude of the signal at the output of an all-pass filter does not change with change in frequency of the input of the all-pass filter.

However, the all-pass filter exhibits phase-shift properties.

The transfer function of all-pass filter 3 is:

$$H(\omega) = -\frac{1 - j\omega R_1 C}{1 + j\omega R_1 C} \tag{1}$$

so that the amplitude versus frequency response is flat.

The phase shift is:

$$\varphi = -2\arctan(\omega R_1 C) \tag{2}$$

Figure 2:
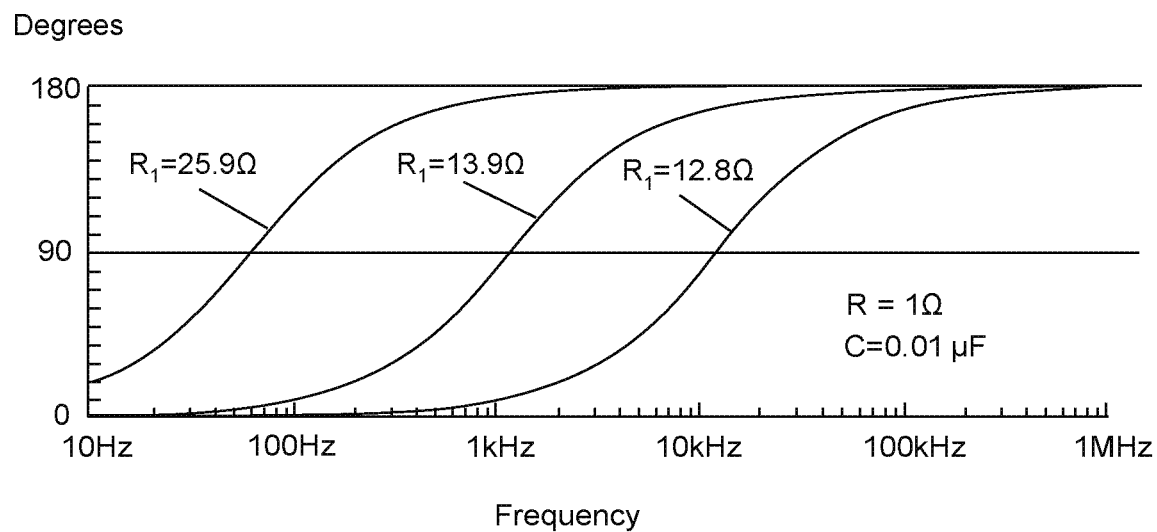
FIG. 2 is a graph of the phase response of the all-pass filter of FIG. 1 for three sets of component values.

FIG. 2 is a graph illustrating the phase difference to frequency relationship of the all-pass filter 3 for R=1Ω, C=0.01 µF and three different values of R1.

The inventor has recognized that all-pass filter 3 is suited to capacitive sensing since it makes use of a grounded capacitor, which can be implemented as a moving plate capacitor or other variable type capacitor that requires grounding. Capacitive sensing typically uses a grounded capacitor. Unfortunately, the Inventor has found that the capacitance-to-phase conversion that is exhibited is not suitable for detecting small changes in capacitance, for example due to small capacitor electrode movements. This can be understood by contemplating the phase shift relationship set out in Eqn (2) and illustrated in the graph of FIG. 2. In particular, a change in the size of C in Eqn (2) does not make a very significant difference to the change in phase shift. Consequently, whilst the topology of the circuit of FIG. 1 is promising as a starting point for building a capacitive sensor, it is of insufficient sensitivity for the very fine sensing that is desired. The Inventor has striven to provide an improvement that can increase the sensitivity so that it is possible to detect very small capacitance variations and thus the physical perturbations that cause them and which it is desired to be able to measure.

In overview, in a first embodiment a capacitance sensing assembly 6 (FIG. 3) is provided which includes a typical all-pass filter 3. The all pass filter 3 includes an op-amp 5 and a first capacitor C with a first electrode 7a of the first capacitor C connected to a non-inverting input 9 of the op-amp 5. A complex impedance circuit Z is connected between a second electrode 7b of the first capacitor C and ground 11. The complex impedance circuit Z includes a variable capacitor $C_0$ having an electrode 13b connected to the ground 11. The complex impedance circuit Z is configured to increase a gradient m of a phase-to-frequency response curve of the capacitance sensing assembly at a predetermined operating point OP. The complex impedance circuit Z increases the gradient m relative to that of the all-pass filter 3, with the second electrode of the first capacitor C connected to ground, as shown in FIG. 1.

Figure 4:
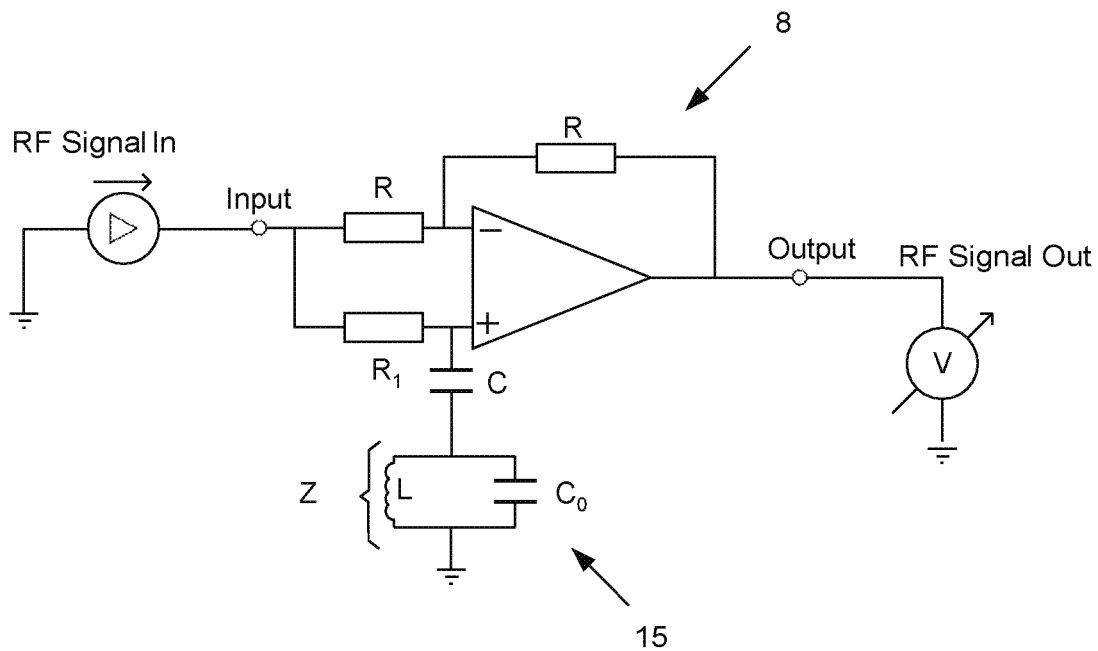
FIG. 4 shows a capacitive sensing circuit wherein the complex impedance circuit block comprises a tank circuit.

In an embodiment of a capacitance sensing assembly 8 that is illustrated in FIG. 4, the complex impedance circuit Z comprises a resonant circuit 15 and the variable capacitor $C_0$ comprises the capacitor $C_0$ of the resonant circuit 15.

In the capacitive sensing circuit 8 of FIG. 4 the resonant circuit 15 comprises an inductor-capacitor tank circuit which includes an inductor L in parallel with the variable capacitor $C_{00}$.

Figure 11:
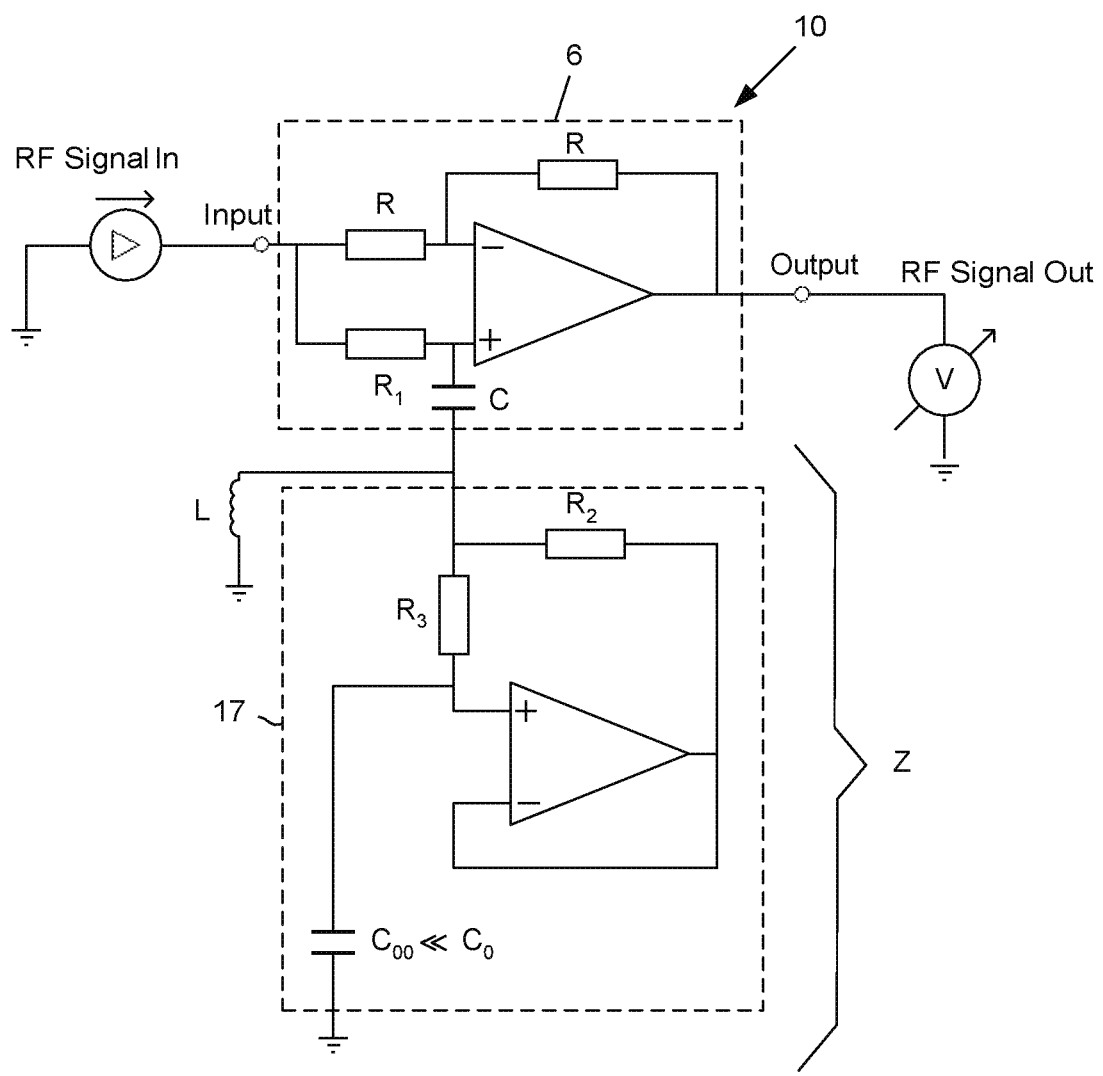
FIG. 11 is a capacitive sensing circuit wherein the complex impedance circuit block comprises the capacitance magnifier circuit.

With reference to the capacitance sensing assembly 10 of FIG. 11, the variable capacitor $C_0$ of the resonant circuit 15 (of FIG. 4) may be implemented with a capacitance magnifier circuit 17 to thereby simulate a larger capacitance value variable capacitor with a smaller capacitance value variable capacitor $C_{00}$.

In another embodiment, a capacitance sensing assembly 12 (FIG. 12), the complex impedance circuit Z comprises a negative capacitor $-C_0$. As shown in FIG. 13, the negative capacitor $-C_0$ may implemented with a negative capacitor simulating circuit 21 including an op-amp 19 and resistors, R2, R3 and variable capacitor $C_0$.

Figure 14:
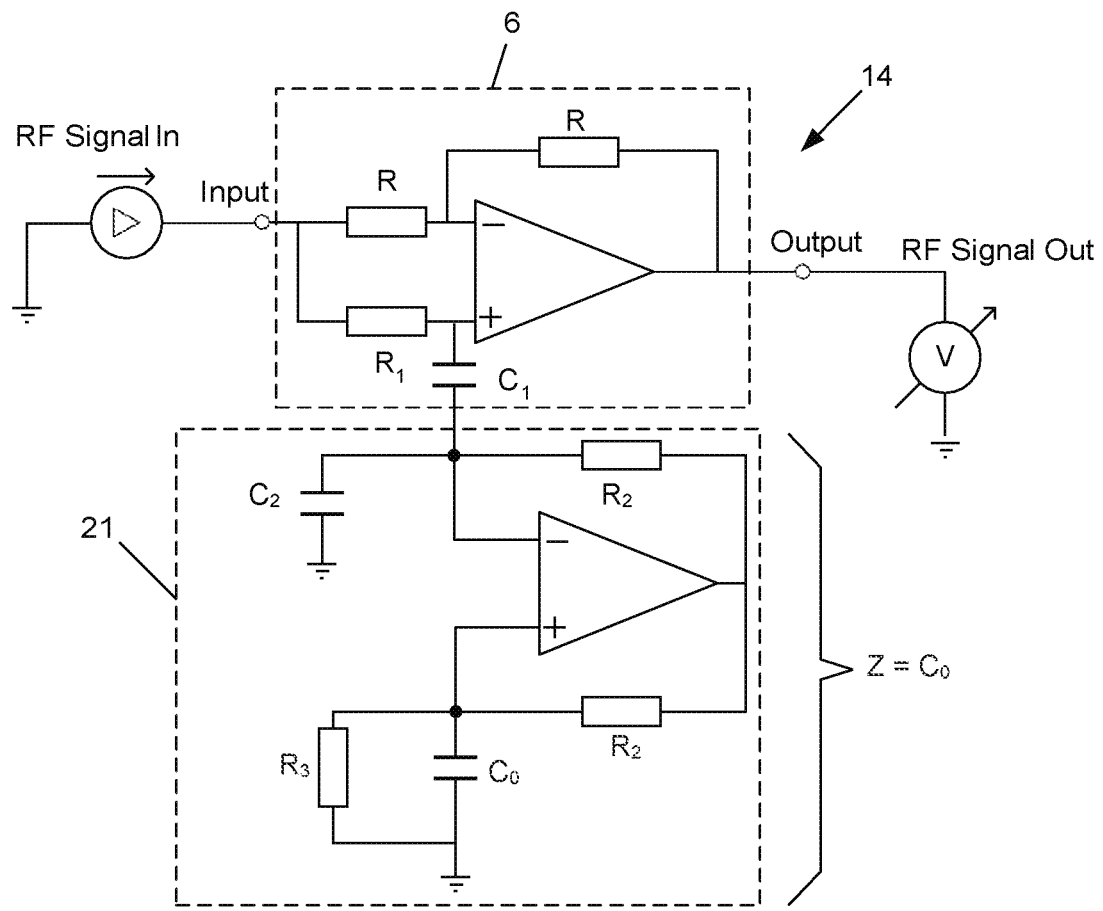
FIG. 14 is a capacitive sensing circuit wherein the complex impedance circuit includes a bias capacitor.

In a further embodiment illustrated in FIG. 14, the capacitance sensing assembly the negative capacitor circuit includes a second capacitor C2 in parallel with the negative capacitor circuit for reducing a fixed (bias) portion of the capacitance of the variable capacitor $C_0$.

Referring now again to FIG. 4 circuit 8 incorporates a complex impedance circuit block Z in the form of a low-Q resonant tank circuit 15 comprising parallel inductor L and variable capacitor $C_0$.

Figure 5:
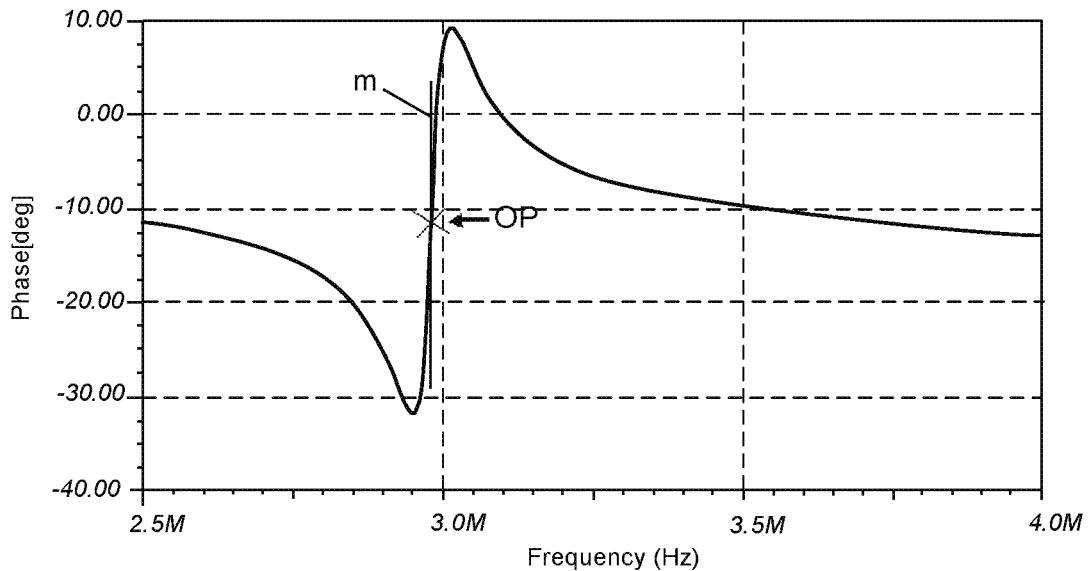
FIG. 5 is a phase response graph for the circuit of FIG. 4 over a range of frequencies.
Figure 6:
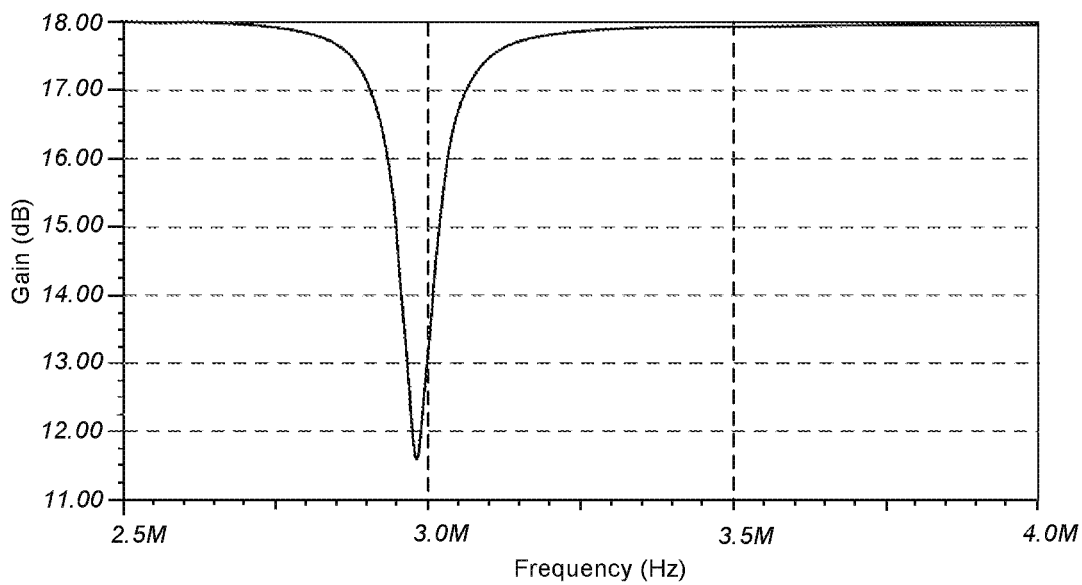
FIG. 6 is a gain response graph for the circuit of FIG. 4 over the range of frequencies.

FIGS. 5 and 6 are circuit simulation plots showing respectively the phase shift response and the magnitude response of the capacitive sensing circuit 8 at a predetermined operating point OP for a fixed carrier frequency.

It will be observed that the addition of the tank circuit 15 makes the phase curve very steep in the vicinity of the fixed carrier frequency. The Inventor has found that a very small change in the value of the variable capacitor $C_0$, for example as might be caused by minute change in distance between the electrodes of $C_0$ due to a physical parameter being sensed, causes a large change in the phase response as indicated by the very steep gradient of tangent m of the graph at OP.

Figure 7:
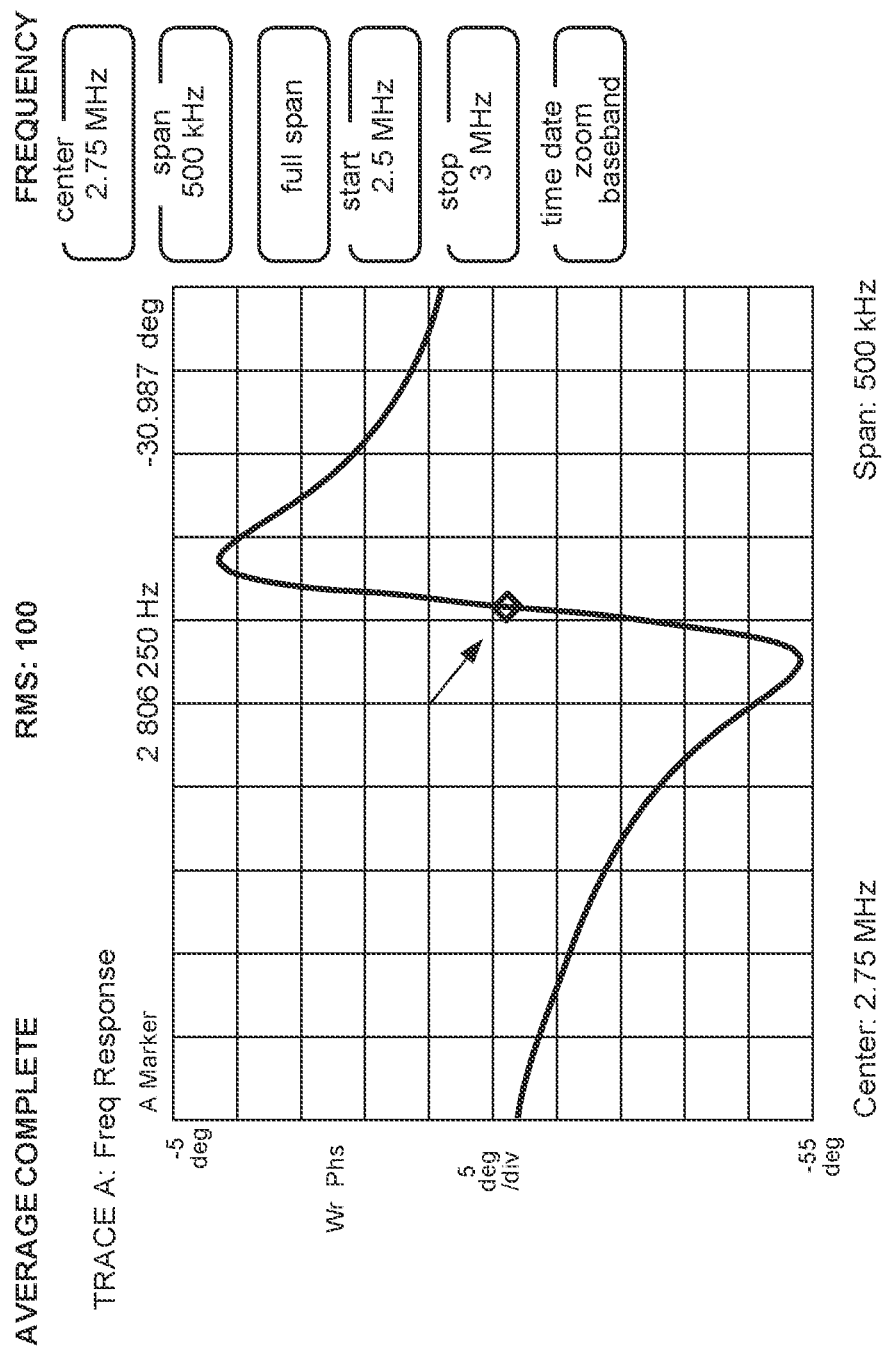
FIG. 7 is an oscilloscope trace of the phase response graph of the circuit of FIG. 4 for a set of component values.
Figure 8:
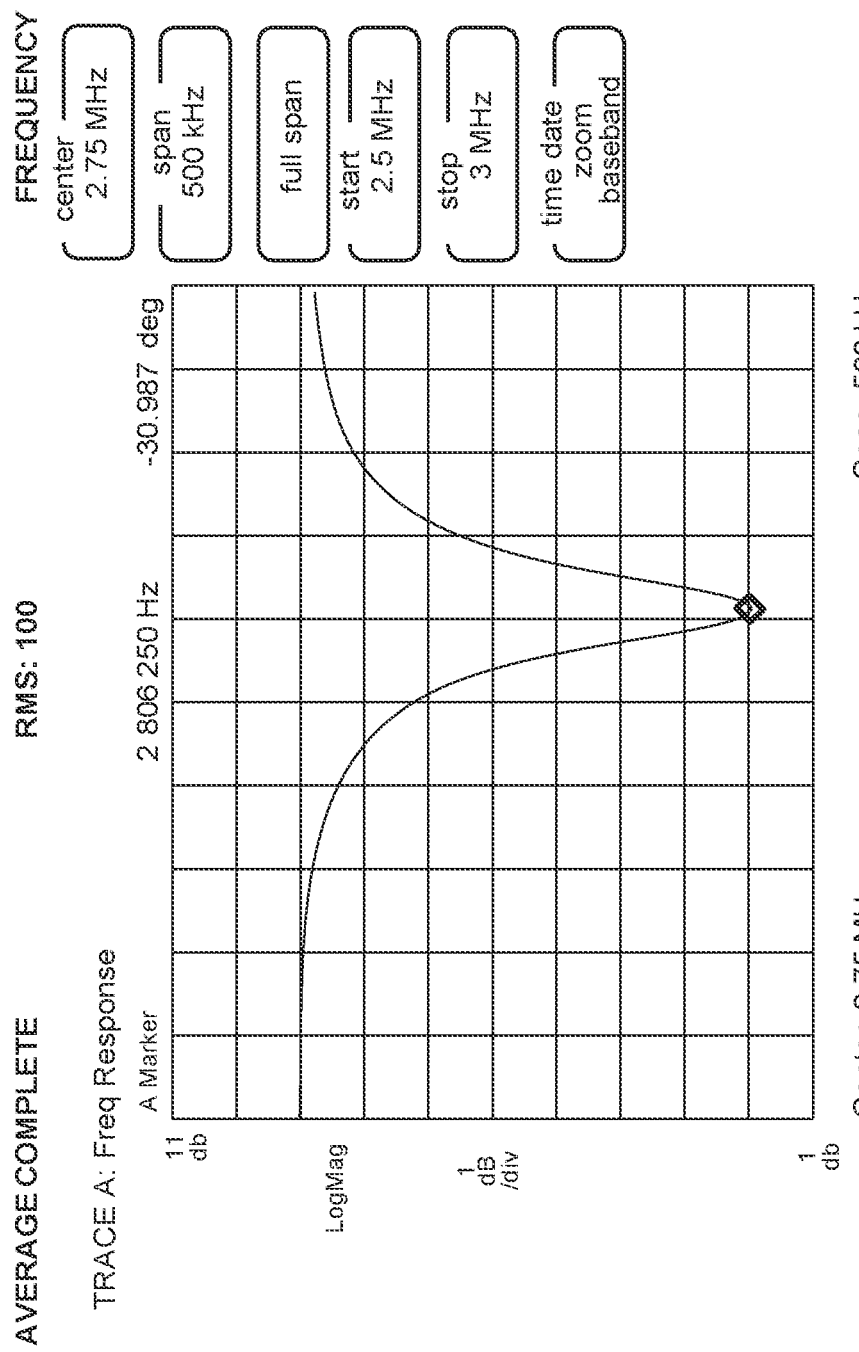
FIG. 8 is an oscilloscope trace of the gain response graph of the circuit of FIG. 4 for the set of component values.

FIGS. 7 and 8 are oscilloscope traces for the sensing circuit of FIG. 4 where the component values are as follows:
R=100 Ohm, R1=220 Ohm
C=6-30 pF tuneable airgap capacitor
L=100 µH, high quality factor inductor
C0~10-15 pF
and the RF signal carrier frequency is 2.806 MHz.

Figure 9:
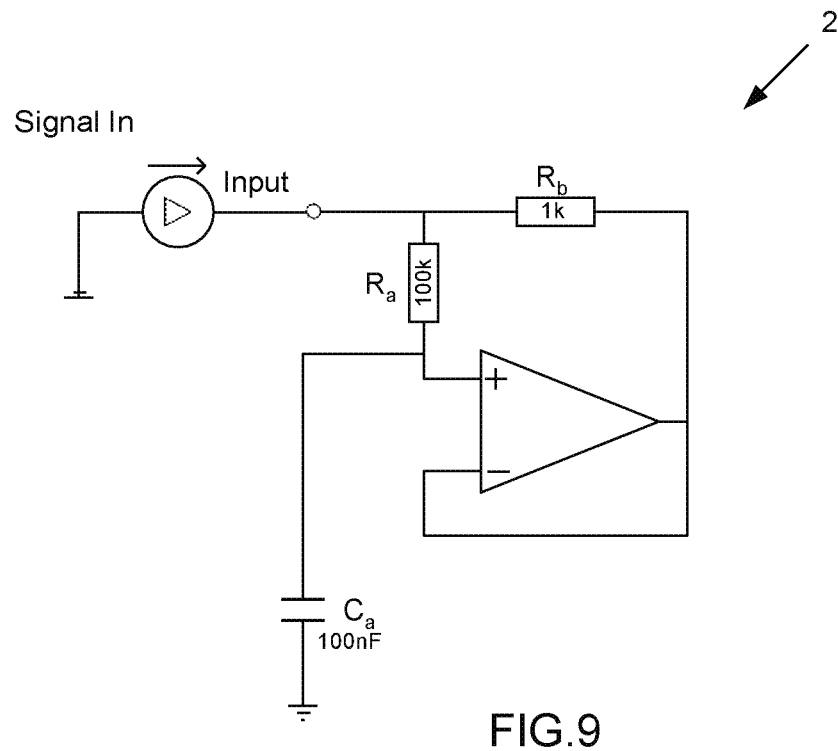
FIG. 9 is circuit of an exemplary capacitance magnifier.
Figure 10:
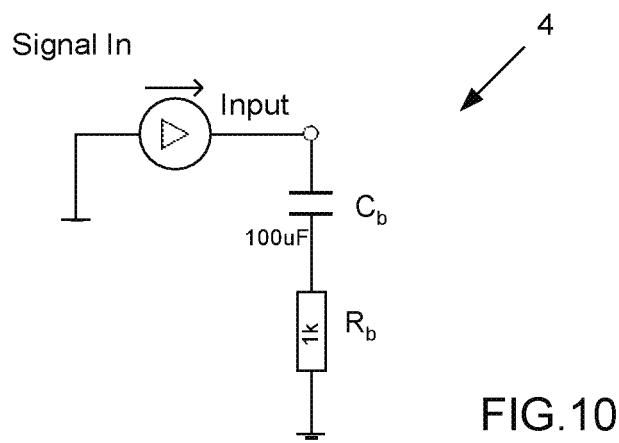
FIG. 10 is a circuit that is simulated by the capacitance magnifier circuit of FIG. 9.

Referring now to FIG. 9, a capacitor multiplier circuit 2, for example as is sometimes used to filter ripple in the output an AC-DC converter, is illustrated. The capacitor multiplier circuit 2 of FIG. 9 uses an op-amp and a small capacitor $C_a$ to simulate a much larger capacitor $C_b$ as shown in the circuit 4 of FIG. 10. Capacitor multiplier circuit 2 simulates circuit 4. The resistor Rb in circuit 2 is the same size as the resistor Rb in the circuit 4 being simulated (FIG. 10), but the capacitor $C_a$ in FIG. 9 is only one hundredth the size of the capacitor $C_b$ in FIG. 10.

The operation of the capacitor multiplier circuit 2 of FIG. 9 will now be explained. Current flows from the input source through $R_a$ to the capacitor ($C_a$). Since $R_a$ is 100 times larger than $R_b$, there is 1/100th the current through it into the capacitor $C_a$. For a given input voltage, the rate of change in voltage in $C_a$ is the same as in $C_b$, because $C_b$ has 100 times the capacitance to make up for 1/100th the current.

Therefore, the voltages across $C_a$ and $C_b$ are the same, but the currents are not. The op-amp in FIG. 9 causes the negative input to be held at the same voltage as the voltage across $C_a$. Consequently, $R_b$ of FIG. 9 has the same voltage across it as $R_b$ of FIG. 10, and therefore the same current.

FIG. 11 depicts a capacitance sensing assembly 10 according to a further embodiment wherein the variable capacitor $C_0$ of the tank circuit of the capacitive sensing circuit of FIG. 4 has been replaced with capacitor multiplier circuit 17 that uses a variable capacitor $C_{00}$ which, according to the selection of R3 and R2, is a fraction of $C_0$. Consequently, the capacitance sensing assembly of FIG. 11 has improved sensitivity compared to the first embodiment 8 of FIG. 4.

Figure 12:
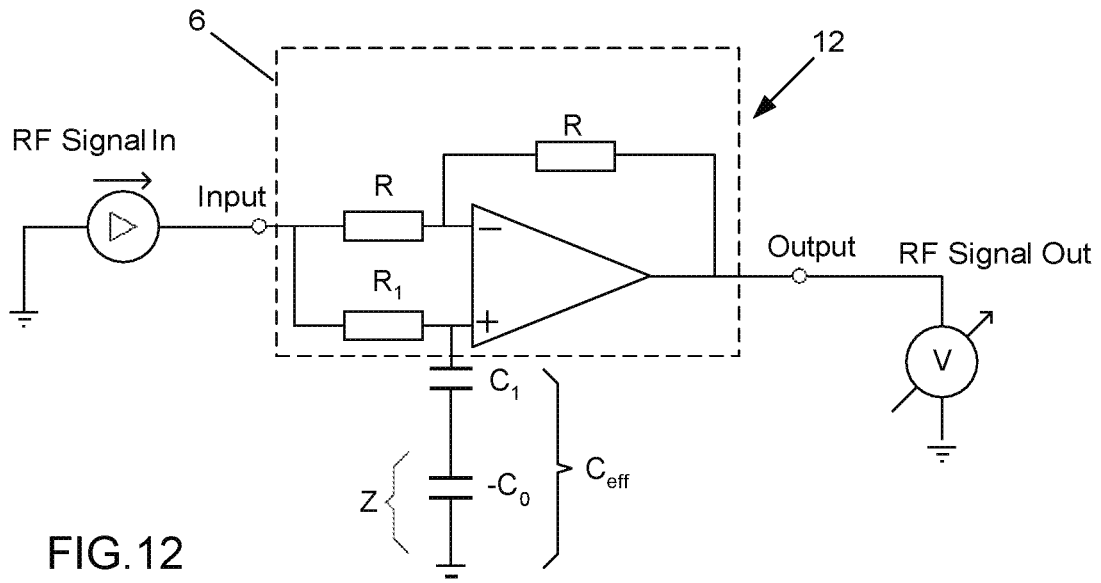
FIG. 12 is a capacitive sensing circuit wherein the complex impedance circuit block comprises a negative capacitor.
Figure 13:
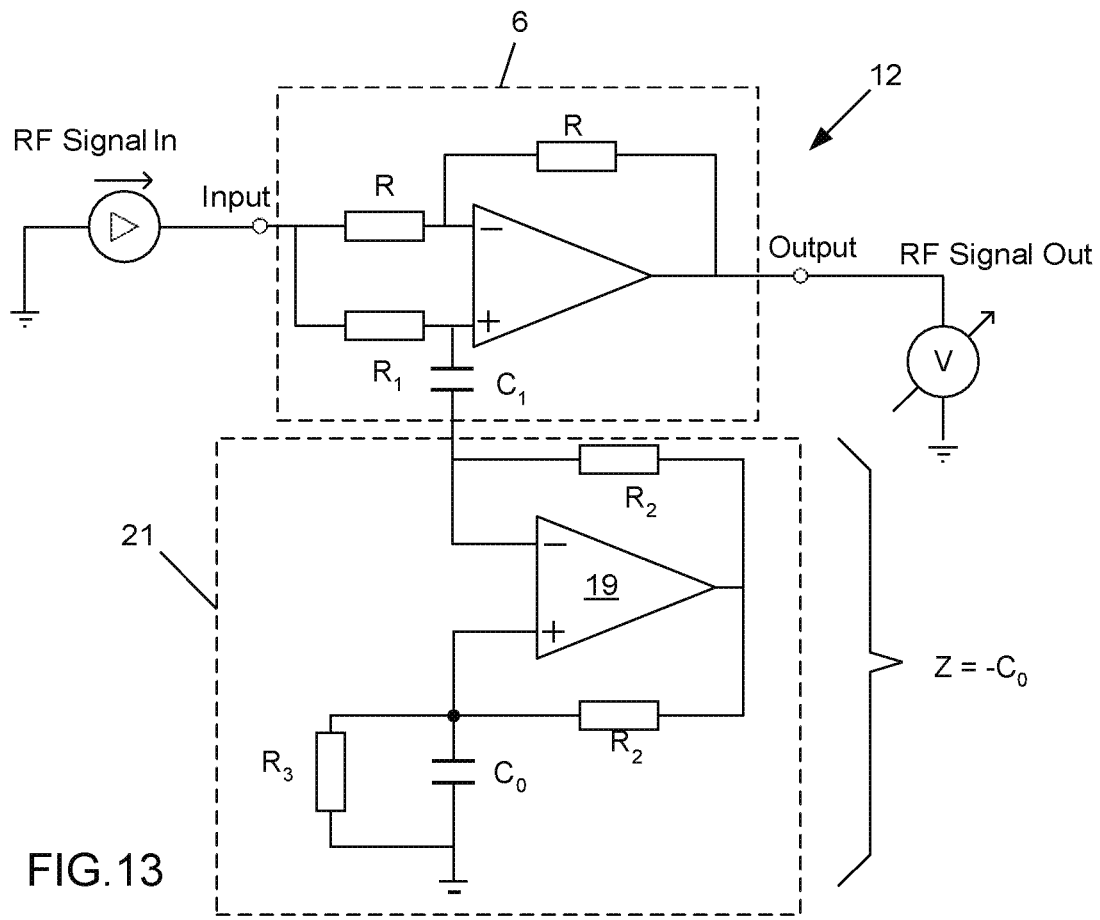
FIG. 13 is a capacitive sensing circuit wherein the negative capacitor is implemented with an op-amp circuit.

FIG. 12 depicts an equivalent circuit of a further embodiment of a capacitive sensing circuit 12 where the effective capacitance is:

$$C_{eff} = \frac{C_1|C_0|}{|C_0| - C_1} \quad (3)$$

If the difference between the positive and the negative capacitors, connected in series, is small, this can magnify the effective capacitance by orders of magnitude. In turn, this will magnify any change in the negative grounded capacitor by the same amount. That what we want in order to increase the effectiveness of the capacitive sensing. This will also allow for a reasonably low frequencies to be used for further signal processing, compared to that of microwave case. The power required to feed the circuit is negligible compared to the latter one. This type of sensing perfectly fits into a Mach-Zehnder interferometry and flip-flop phase detectors in which an overall sensing capacitance $C_s$ is reduced to a value of $C_1+(-C_0)$ where $-C_0$ is a negative capacitance.

The negative capacitance is implemented using a negative capacitance op-amp circuit 21 as shown in FIG. 13. Negative capacitance op-amp circuits are analogous to the more widely known negative resistance circuits and are discussed for example at: https://en.wikibooks.org/wiki/Circuit_Idea/Revealing_the_Mystery_of_Negative_Impedance#Op-amp_implementation (retrieved Jul. 11, 2021).

FIG. 14 depicts another embodiment wherein the constant part of the variable capacitor (−CO) (its bias) is reduced by placing capacitor C2 in parallel with the −CO circuit to highlight its variable part: —C0+C2−ΔC0, C2<|C0|

The Inventor believes that various of the embodiments discussed herein provide a low cost and size capacitance sensing assembly for measuring capacitance variations in moving plate capacitors as low as <10-20 Farad (0.00001 femtoFarad). Consequently, very small movements of the electrode, e.g. the grounded electrode of the variable capacitor may be sensed and so correspondingly, very small movements and accelerations of physical objects to which the grounded electrode is attached. Also, a very small electric field of much less than a microvolt per metre magnitude can be detected if the variable capacitor comprises a varicap.

The Inventors have found that the performance of capacitance sensing assemblies described above (see FIGS. 3 to 14, for example) can be replicated, and even improved in some embodiments, by the capacitance sensing assemblies that follow hereafter.

The following embodiments no longer use the all-pass filter configuration and, thus a complex impedance is now connected directly to the positive (non-inverting) input of an op-amp and the capacitor is connected directly to ground, rather than to the non-inverting input of the op-amp.

In another embodiment, a capacitance sensing assembly 150 (FIG. 15) is provided. The capacitance sensing assembly 150 includes an op-amp 5, a sensing capacitor C and four complex impedance circuits: a first complex impedance circuit Z1, a second complex impedance circuit Z2, a third complex impedance circuit Z3 and a fourth complex impedance circuit Z4.

A first terminal of the first complex impedance circuit Z1 is connected to an inverting input (−) of the op-amp 5.

A first terminal of the second complex impedance circuit Z2 is connected to a second terminal of the first complex impedance circuit Z1 and a second terminal of the second complex impedance circuit Z2 connected to the non-inverting input of the op-amp 5.

A first terminal of the third complex impedance circuit Z3 is connected to the inverting input (−) of the op-amp 5 and a second terminal of the third complex impedance circuit Z3 is connected to an output of the op-amp 5.

A first terminal of the fourth complex impedance circuit Z4 is connected to the non-inverting input (+) of the op-amp 5.

The sensing capacitor C is connected in parallel to the fourth complex impedance circuit Z4 and the sensing capacitor C has a first electrode connected to the non-inverting input (+) of the op-amp 5 and a second electrode connected to the ground.

The four complex impedance circuits Z4 are configured such that a gradient of a phase to frequency response curve of the capacitance sensing assembly 150 is increased relative to that of an all-pass filter with a second electrode of a capacitor connected to the non-inverting input of the op-amp and the ground without the fourth complex impedance circuit.

Figure 16:
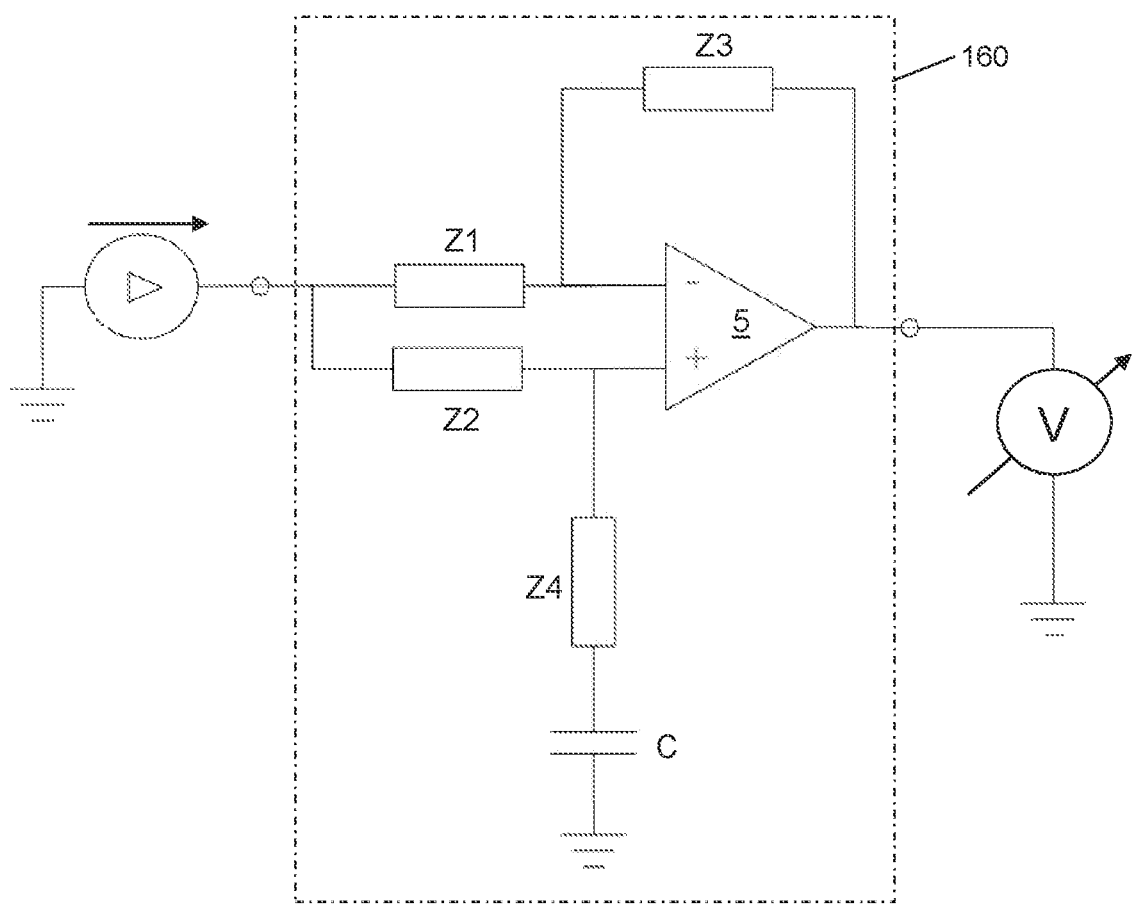
FIG. 16 shows a capacitive sensing circuit with four complex impedance circuit blocks.

FIG. 16 shows another embodiment of a capacitance sensing assembly 160 where the fourth complex impedance circuit Z4 and the sensing capacitor C are connected in series.

The capacitance sensing assembly 160 includes an op-amp 5, a sensing capacitor C and four complex impedance circuits: a first complex impedance circuit Z1, a second complex impedance circuit Z2, a third complex impedance circuit Z3 and a fourth complex impedance circuit Z4.

A first terminal of the first complex impedance circuit Z1 is connected to an inverting input (−) of the op-amp 5.

A first terminal of the second complex impedance circuit Z2 is connected to a second terminal of the first complex impedance circuit Z1 and a second terminal of the second complex impedance circuit Z2 connected to the non-inverting input of the op-amp 5.

A first terminal of the third complex impedance circuit Z3 is connected to the inverting input (−) of the op-amp 5 and a second terminal of the third complex impedance circuit Z3 is connected to an output of the op-amp 5.

A first terminal of the fourth complex impedance circuit Z4 is connected to the non-inverting input (+) of the op-amp 5.

The sensing capacitor C has a first electrode connected to the non-inverting input (+) of the op-amp 5 and a second electrode connected to the ground. As such, the sensing capacitor C is connected in series with the fourth complex impedance circuit Z4.

The four complex impedance circuits Z4 are configured such that a gradient of a phase to frequency response curve of the capacitance sensing assembly is increased relative to that of an all-pass filter with a second electrode of a capacitor connected to the non-inverting input of the op-amp and the ground without the fourth complex impedance circuit.

Figure 17:
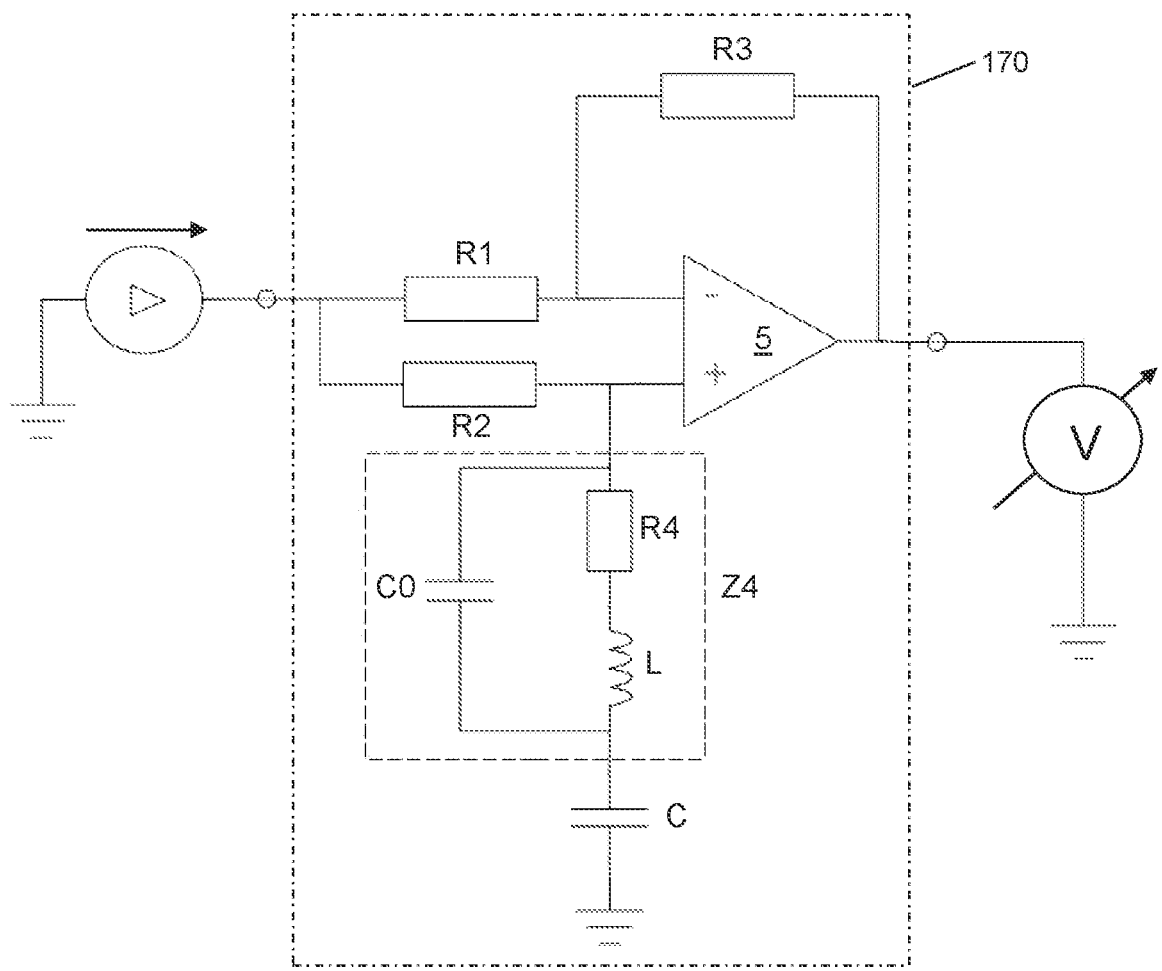
FIG. 17 shows a capacitive sensing circuit with four complex impedance circuit blocks, wherein the fourth complex impedance circuit includes a resistor, an inductor and a capacitor.

FIG. 17 shows an embodiment of the capacitance sensing assembly 170 shown in FIG. 16.

In the illustrated embodiment, the first, second and third complex impedance circuits Z1, Z2, Z3 consist of respective first, second and third resistors R1, R2, R3.

The first and second resistors R1, R2 are equal resistance of 51 ohm. The third resistor R3 has a resistance of 100 ohm. It will be noted that the values of the resistors, and in particular, the values of the resistors connected to the inverting input of the op-amp (resistors R1, R3) are not equal.

The fourth complex impedance Z4 consists of a resistor R4, an inductor L connected in series with the resistor R4 and the ground, and a first capacitor $C_0$ (a variable capacitor) connected to a first terminal of the resistor R4, a first terminal of the inductor L and the ground.

The fourth complex impedance circuit Z4 remains in series with the sensing capacitor C.

In the above embodiment, the resistor R4 represents an internal DC and loss resistance of the inductor L, and the capacitor $C_0$ represents an interwinding capacitance of the inductor L. Therefore, the R4 and $C_0$ elements are not external in the fourth complex impedance element Z4 consisting of inductor L only.

The sensing capacitor C has a capacitance of 18 pF and the inductor L has an inductance of 467 μH.

Figure 18:
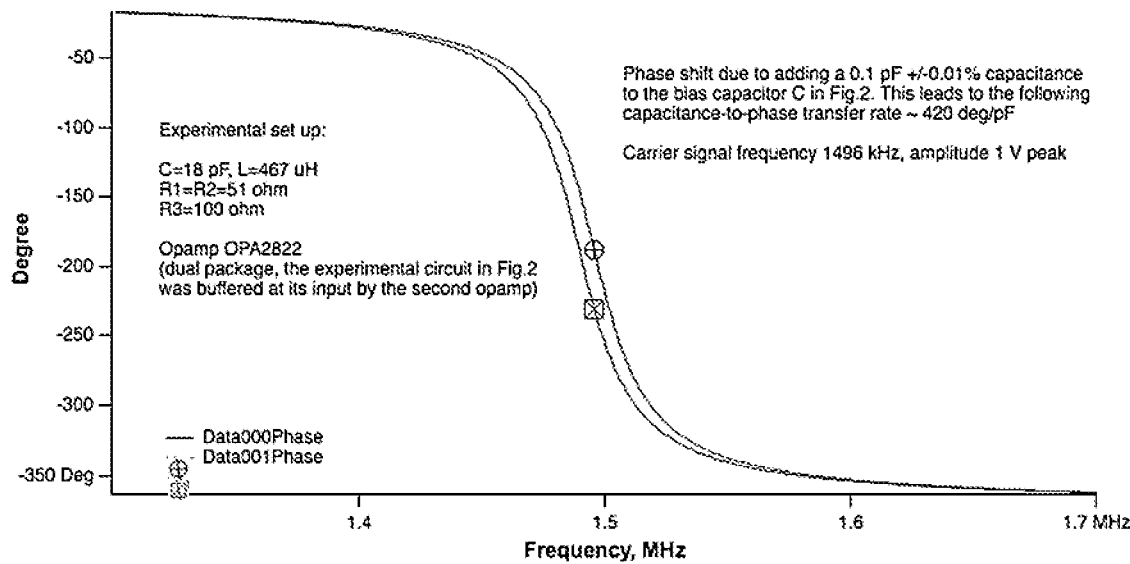
FIG. 18 is a phase response graph for the circuit of FIG. 17 over a range of frequencies.
Figure 19:
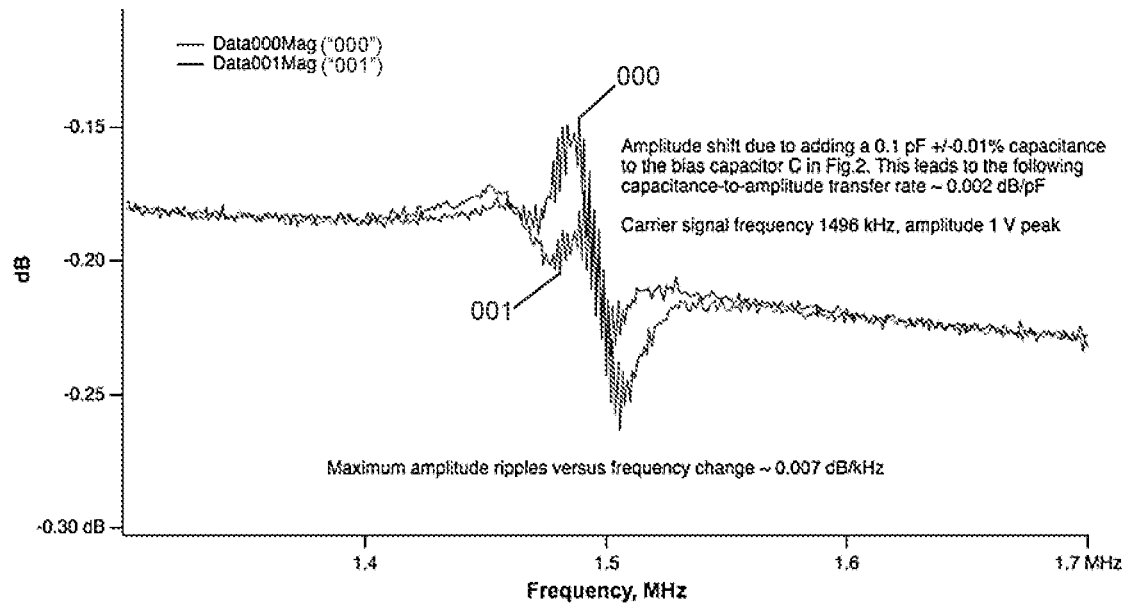
FIG. 19 is a gain response graph for the circuit of FIG. 17 over the range of frequencies.

Referring now to FIGS. 18 and 19, graphs showing comparative results of the capacitance sensing assembly illustrated in FIG. 17 compared to the performance of an All-Pass Filter. It will be noted that the input to the assembly 170 shown in FIG. 17 was buffered by a second operational amplifier to obtain the results illustrated FIGS. 18 and 19.

Figure 3:
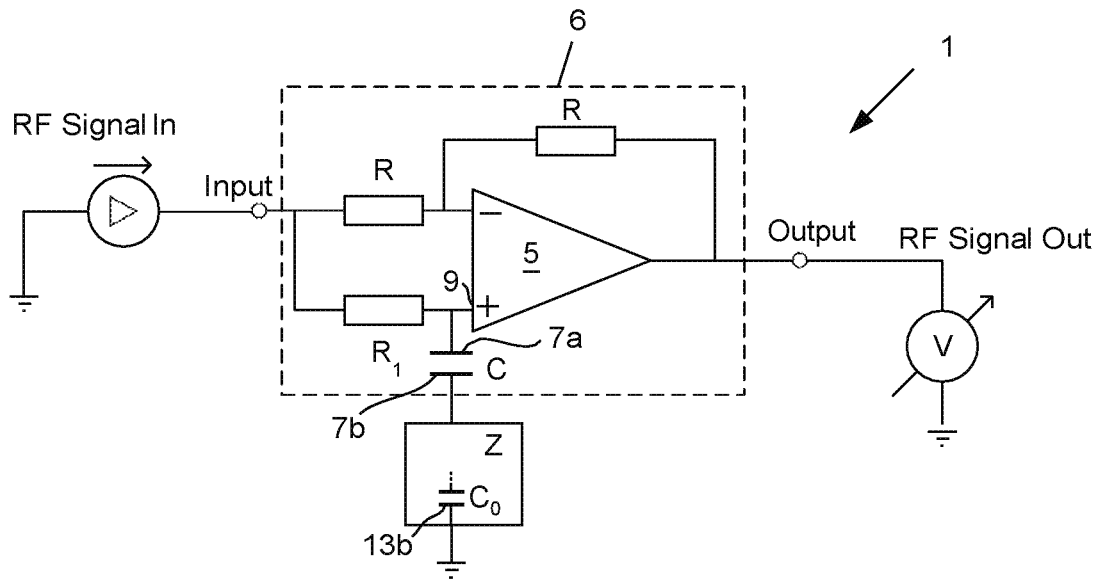
FIG. 3 shows the circuit of FIG. 2 with a complex impedance circuit block inserted between the capacitor and ground.

In FIG. 18, there is a minimum one-fold increase in the capacitance-to-phase transfer function of the assembly of FIG. 17 compared to assemblies using an all-pass filter (such as the assembly shown in FIG. 3, for example).

In FIG. 19, there is a significant reduction of the frequency-to-amplitude transfer function to an almost flat level. This illustrates that the frequency-to-amplitude ratio of the circuit of FIG. 17 is almost the same as for a classic first-order All-Pass Filter where the amplitude of the carrier signal is independent of its frequency.

Figure 15:
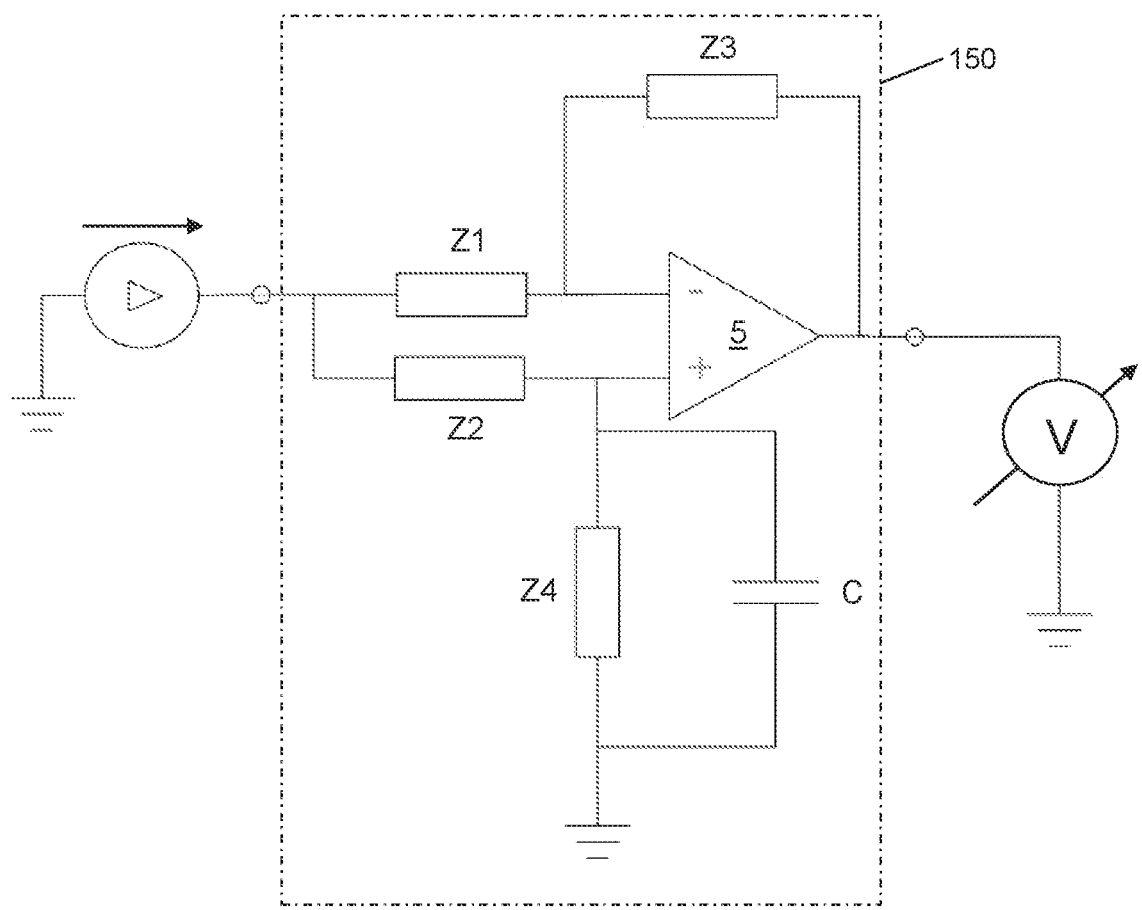
FIG. 15 shows a capacitive sensing circuit with four complex impedance circuit blocks.
Figure 20:
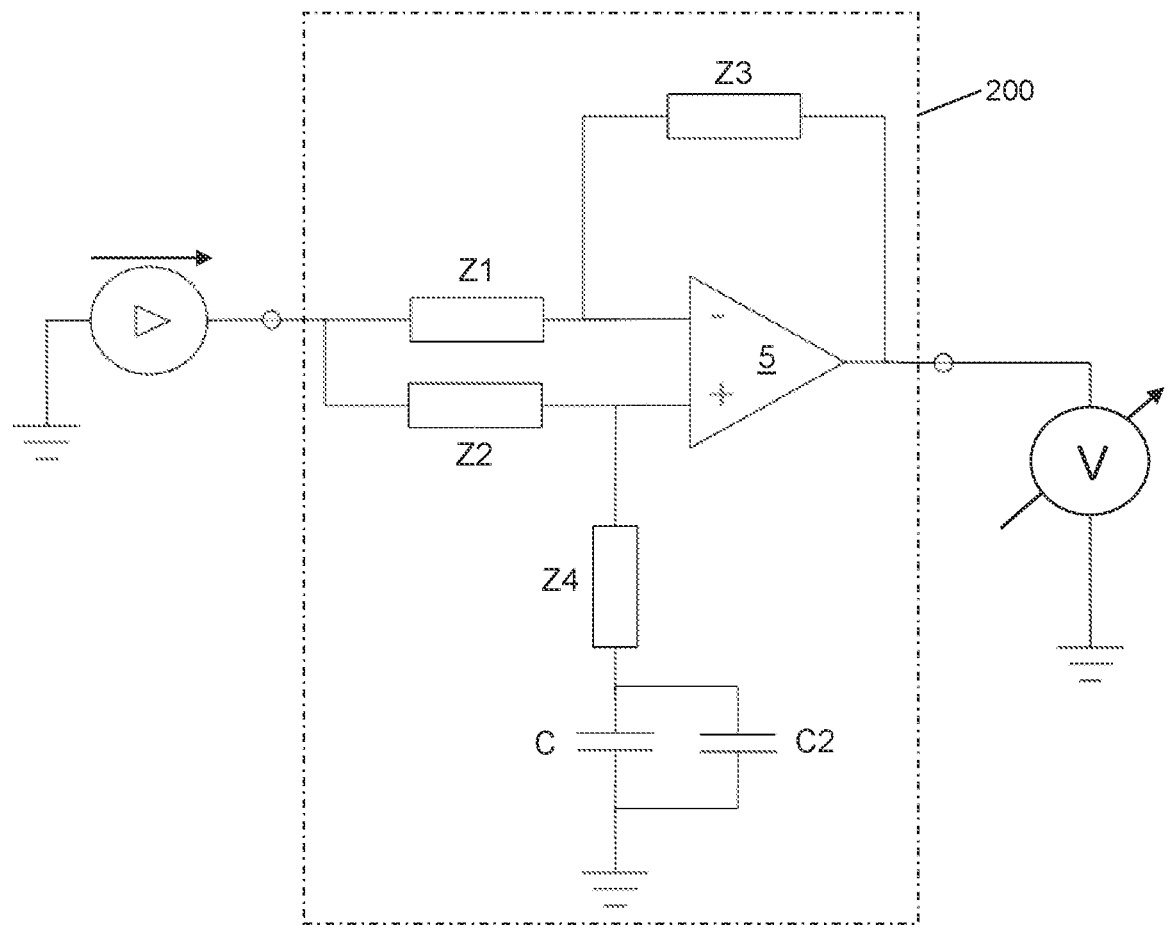
FIG. 20 shows a capacitive sensing circuit with four complex impedance circuit blocks and a fixed (bias) capacitor in parallel with the sensing capacitor.

FIG. 20 illustrates another embodiment of the capacitance sensing assembly 200 of FIG. 15, wherein a fixed (bias) capacitor C2 may be connected in parallel with the sensing capacitor C. This embodiment is particularly useful in MEMS based transducers where the sensing capacitance is typically about a few pF or less.

In some embodiments, a second op-amp is provided. The output of the second op-amp is connected to the input of the op-amp to provide buffering of the signal provided to the input terminal.

Figure 21:
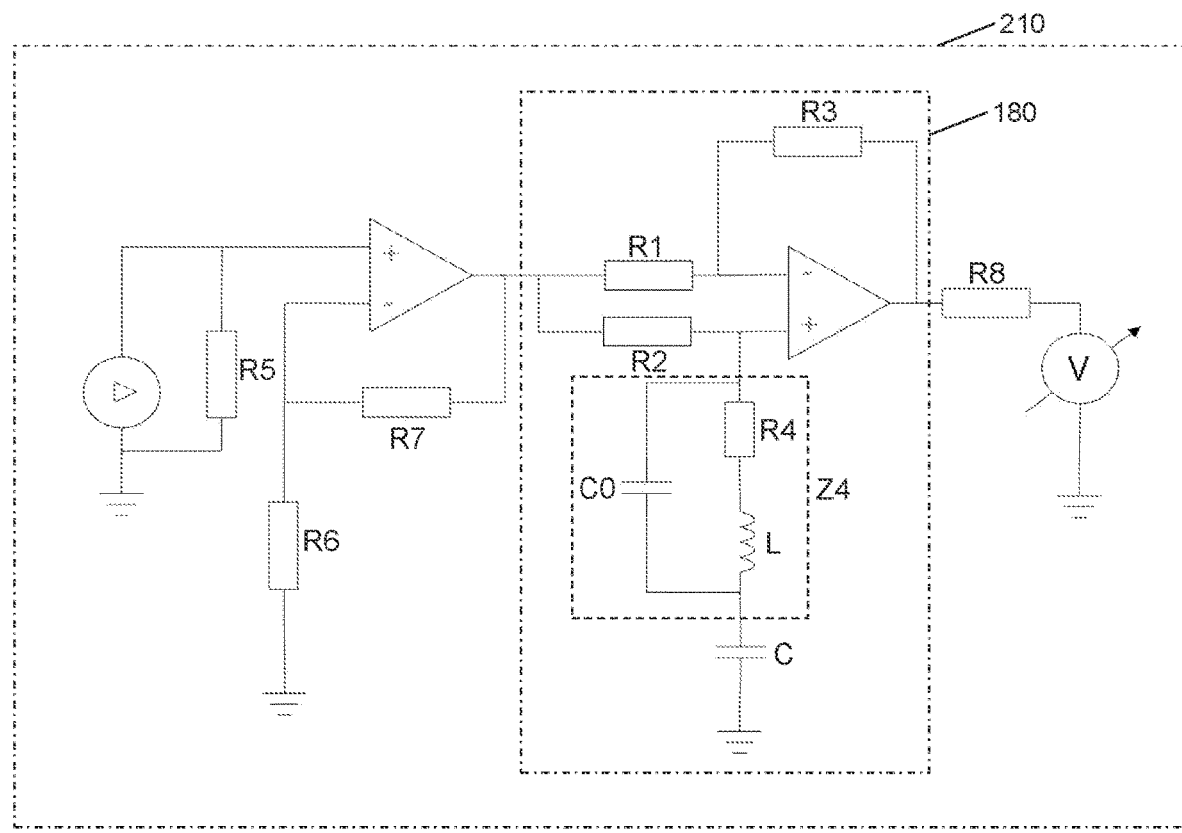
FIG. 21 shows an integrated circuit incorporating a capacitive sensing circuit and a second op-amp as a buffer to the capacitive sensing circuit.

An embodiment of an integrated circuit 210 is shown in FIG. 21.

The integrated circuit 210 includes the capacitance sensing assembly 170 from FIG. 17 connected to a second op-amp 5a as a buffer. This embodiment represents a dual op-amp package in the form of the integrated circuit 210 that includes the two op-amps 5, 5a.

The second op-amp 5a provides high input impedance and low impedance to ensure that the input signal provided to the op-amp 5 of the capacitance sensing assembly 170 is not affected by the load connected to the output of the buffer (the second op-amp 5a).

The input load is connected to the non-inverting input (+) of the second op-amp A fifth resistor R5 is connected in parallel with the input load.

A first terminal of a sixth resistor R6 is connected to the inverting input (−) of the second op-amp 5a and the second terminal of the sixth resistor R6 is connected to the ground. A first terminal of a seventh resistor R7 is connected to the output of the second op-amp 5a and a second terminal of the seventh resistor R7 is connected to the inverting input (−) of the second op-amp 5a and the first terminal of the sixth resistor R6.

An eighth resistor R8 is connected to the output of the op-amp 5.

Any embodiments of the capacitance sensing assembly described herein may form part of or be incorporated into an integrated circuit.

The Inventors believe that embodiments of the invention described here reduce unwanted frequency-to-amplitude modulation rate to an insignificant level to thereby replicate almost perfect All-Pass Filter behaviour where only very high frequency-to-phase and capacitance-to-phase conversion rate are achieved. In compliance with the statute, the subject matter disclosed herein has been described in language more or less specific to structural or methodical features. The term "comprises" and its variations, such as "comprising" and "comprised of" is used throughout in an inclusive sense and not to the exclusion of any additional features. It is to be understood that the subject matter disclosed herein is not limited to specific features shown or described since the means herein described comprises preferred forms of putting the disclosed subject matter into effect. The disclosed subject matter is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment herein is meant to be illustrative only and is not meant to be limiting. Therefore, it should be appreciated that various other changes and modifications can be made to any embodiment described without departing from the spirit and scope of the subject matter disclosed herein.

The invention claimed is:

1. A capacitance sensing assembly comprising:
   an op-amp;
   a first complex impedance circuit with a first terminal of the first complex impedance circuit connected to an inverting input of the op-amp;
   a second complex impedance circuit with a first terminal of the second complex impedance circuit connected to a second terminal of the first complex impedance circuit and a second terminal of the second complex impedance circuit connected to a non-inverting input of the op-amp;
   a third complex impedance circuit with a first terminal of the third complex impedance circuit connected to the inverting input of the op-amp and a second terminal of the third complex impedance circuit connected to an output of the op-amp;
   a fourth complex impedance circuit with a first terminal of the fourth complex impedance circuit connected to the non-inverting input of the op-amp;
   a sensing capacitor with:
     a first electrode of the sensing capacitor connected to a second terminal of the fourth complex impedance circuit and a second electrode of the sensing capacitor connected to a ground; or
     the first electrode of the sensing capacitor connected to the non-inverting input of the op-amp and the first terminal of the fourth complex impedance circuit and the second electrode of the sensing capacitor connected to the ground and the second terminal of the fourth complex impedance circuit, wherein the fourth complex impedance circuit is connected in parallel to the sensing capacitor; and
   wherein the complex impedance circuits are configured to increase a gradient of a phase to frequency response curve of the capacitance sensing assembly relative to that of an all-pass filter with a second electrode of a capacitor connected to the non-inverting input of the op-amp and the ground without the fourth complex impedance circuit.

2. The capacitance sensing assembly of claim 1, wherein the first, second and third complex impedance circuits include resistors.

3. The capacitance sensing assembly of claim 1, wherein the first, second and third complex impedance circuits consist of resistors.

4. The capacitance sensing assembly of claim 1, wherein the fourth complex impedance circuit comprises a first capacitor.

5. The capacitance sensing assembly of claim 4, wherein the first capacitor is a variable capacitor.

6. The capacitance sensing assembly of claim 4, wherein the fourth complex impedance circuit comprises a second capacitor in parallel with the first capacitor.

7. The capacitance sensing assembly of claim 1, wherein the fourth complex impedance comprises a resistor, an inductor connected in series with the resistor and the ground, and a first capacitor connected to a first terminal of the resistor, a first terminal of the inductor and the ground.

8. An integrated circuit including the capacitance sensing assembly of claim 1.

* * * * *